H. FORD.
CLUTCH.
APPLICATION FILED APR. 15, 1918.
1,375,956. Patented Apr. 26, 1921.
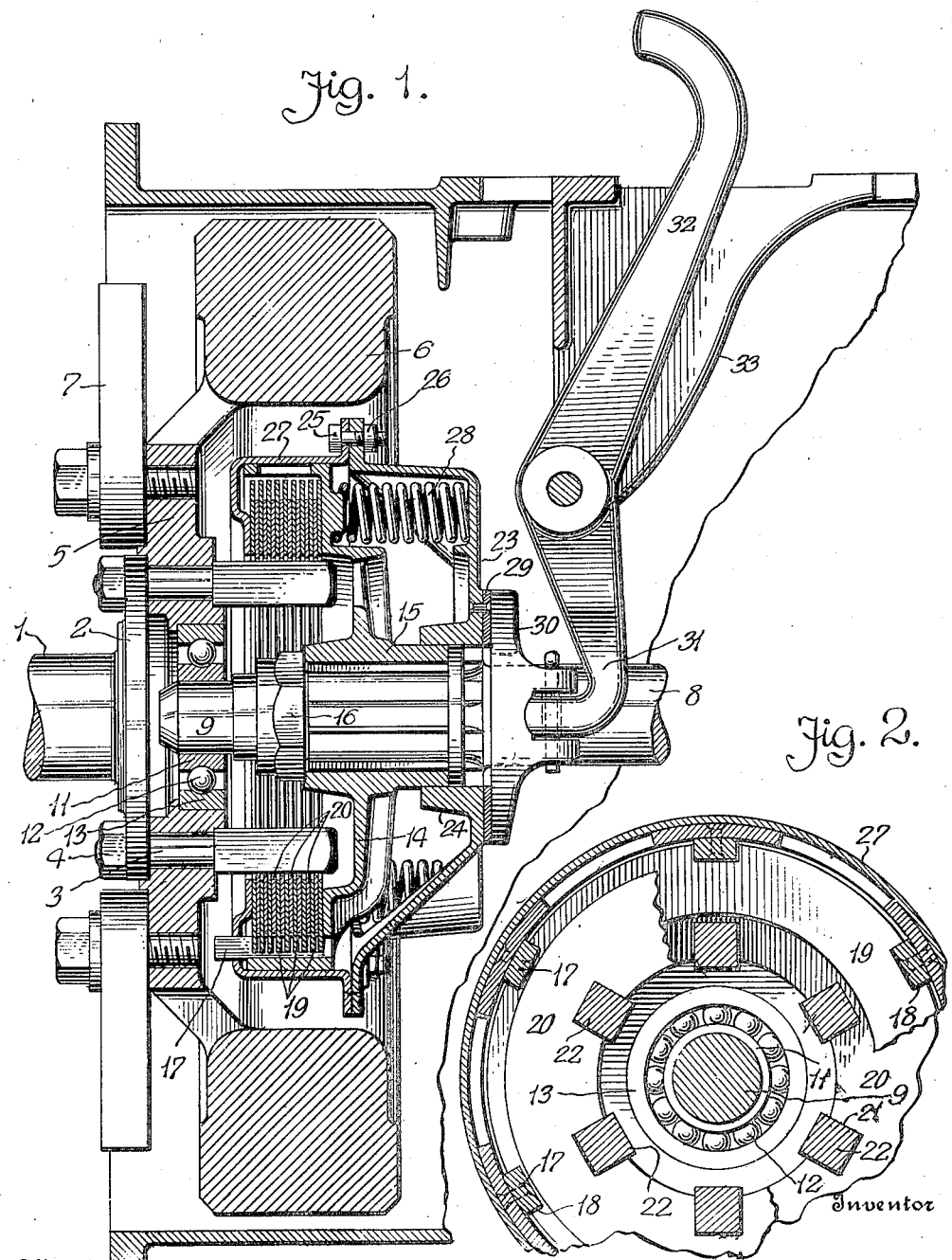

UNITED STATES PATENT OFFICE.

HENRY FORD, OF DEARBORN, MICHIGAN.

CLUTCH.

1,375,956.  Specification of Letters Patent.  Patented Apr. 26, 1921.

Application filed April 15, 1918. Serial No. 228,589.

*To all whom it may concern:*

Be it known that I, HENRY FORD, a citizen of the United States of America, residing at Dearborn, in the county of Wayne and State of Michigan, have invented certain new and useful Improvements in Clutches, of which the following is a specification, reference being had therein to the accompanying drawings.

The tractors which I am now building have a novel clutch for connecting the engine shaft of the tractor to the transmission drive shaft, so that the engine can pick up its load gradually and start the tractor without jolts or jars.

My invention in connection with this clutch resides in combining a clutch with the fly wheel of the engine shaft; utilizing the fastening means between the engine shaft and the fly wheel as supports for a plurality of friction disk clutch plates; providing a novel clutch housing with friction disks or clutch plates that are normally maintained in frictional contact or driving relation with the friction disks or clutch plates of the fly wheel, and providing novel means for bodily shifting such clutch holding means so as to release the transmission drive shaft relative to the engine shaft.

Briefly described, the clutch operates by the frictional engagement between the two sets of friction disks or clutch plates forced together by springs. The driving set of disks or plates fit on studs fixed in the fly wheel; the set of driven plates fit keys in the clutch drum which is fixed on the driven shaft. When the clutch is engaged—by allowing the clutch pedal to rise—the springs force all of the disks or plates together, the resulting friction causing the disks or plates to revolve as one solid unit. When the clutch is disengaged—by pressing down on the clutch pedal—spring pressure on the plates is released allowing the plates to slip past each other thus permitting the engine to run free.

The novel construction of the clutch and the compact arrangement of parts will be hereinafter described and then claimed, and reference will now be had to the drawing, wherein—

Figure 1 is a vertical longitudinal sectional view of a clutch in accordance with my invention, and Fig. 2 is a cross sectional view of a portion of the clutch housing.

In the drawing, the reference numeral 1 denotes an engine shaft and on the end thereof is a peripheral flange or head 2 connected by bolts 3 and nuts 4 or other fastening means to the hub portion 5 of the fly wheel 6. The rim of the fly wheel is offset relative to the hub portion 5 and magnets 7 may be connected to the hub portion 5 to form part of a magneto.

8 denotes a transmission drive shaft longitudinally alining with the engine shaft 1, and said transmission drive shaft extends centrally of the fly wheel 6 and has the reduced end 9 thereof in the hub portion 5 of the fly wheel, where the reduced end 9 is provided with a ball race 11 for balls 12 in a ball race 13, the elements 11, 12 and 13 constituting the conventional form of anti-frictional bearings which centers the reduced end 9 of the transmission drive shaft 8 relative to the hub portion 5 of the fly wheel 6.

14 denotes a clutch drum having a hub 15 fixed on the transmission drive shaft 8 to rotate therewith, and the hub 15 may have longitudinal tongues extending into grooves in the shaft 8 or may be otherwise fixed on the shaft. As shown, the clutch drum is detachably mounted on the shaft and retained thereon by a nut 16.

17 denotes a plurality of longitudinal keys riveted or otherwise connected to the inner wall of the drum 14, and said keys extend into notches 18 provided therefor in a series of friction disks or clutch plates 19. Between the friction disks or clutch plates 19 is another series of friction disks or clutch plates 20 having notches 21 to receive studs 22 on the inner ends of the bolts 3 of the fly wheel, and the disks or plates 20 may be considered as the drive disks or plates since said plates rotate with the fly wheel, and the plates 19 may be considered driven plates, as it is the sole engagement between the plates 19 and 20 that establishes the driving relation between the shafts 1 and 8.

23 denotes a front clutch housing having a hub portion 24 slidable on the hub 15 of the clutch drum 14 and connected to the front clutch housing by a plurality of bolts 25 and nuts 26 is a detachable rear clutch housing 27, said rear clutch housing inclosing the clutch drum and the plates 19 and 20 and serving as an abutment therefor independent of the fly wheel. The plates 19 and 20 are sandwiched between the rear clutch housing and the drum 14 and between said drum and the front clutch housing are a plurality of coiled compression springs 28, which are preferably disposed in pockets so as not to become accidentally displaced. It is the expansive force of the springs 28 that maintains the plates 19 and 20 in frictional contact and driving relation, and by pressing or shifting the clutch housing toward the fly wheel, the springs 28 are compressed and the series of plates 19 permitted to remain stationary during the rotation of the series of plates 20 by the engine shaft 1.

To accompish this, the hub 24 of the front clutch housing is provided with a wear plate 29 and normally engaging said wear plate are pivoted shoes 30 carried by the forked lower end 31 of a clutch pedal 32, the forked end of the clutch pedal spanning the transmission drive shaft 8 and said clutch pedal being fulcrumed in a suitable bearing or bracket 33 that may form part of the transmission housing. As pointed out in the beginning by pressing down on the clutch pedal the spring pressure on the clutch disks or plates is released, allowing the plates to slip past each other thus permitting the engine shaft 1 to run free of the transmission drive shaft and allowing the gears of the transmission mechanism to engage and disengage without any danger of the teeth thereof being broken or of a clashing of the gears.

I attach considerable importance to the fact that the bearing in the fly wheel maintains the transmission drive shaft in alinement with the engine shaft and constitutes supporting means for a portion of the clutch which is compactly housed in the fly wheel.

What I claim is:—

1. The combination of a driven fly wheel, a plurality of clutch plates supported therein, a clutch housing movable in said fly wheel, a plurality of clutch plates carried by said clutch housing adapted to frictionally engage the clutch plates of said fly wheel, and means adapted for shifting said clutch housing.

2. The combination with a driven fly wheel, of a plurality of clutch plates supported therein, a clutch housing movable relatively to said fly wheel, a plurality of clutch plates in said clutch housing, means in said clutch housing maintaining the clutch plates thereof normally in frictional contact with the clutch plates of said fly wheel, and means exteriorly of said clutch housing adapted for shifting said clutch housing to release the clutch plates thereof relatively to the clutch plates of the fly wheel.

3. In a clutch, an engine shaft, and a transmission drive shaft, a fly wheel carried by said engine shaft and supporting an end of said transmission drive shaft, clutch plates in said fly wheel, a clutch housing extending therein, clutch plates in said housing normally in frictional contact with the clutch plates of said fly wheel, and means adapted for bodily shifting said clutch housing to release the clutch plates thereof relatively to the clutch plates of the fly wheel.

4. In a clutch for tractors, the combination of an engine shaft, a fly wheel carried thereby, a transmission drive shaft having an end thereof journaled in said fly wheel, clutch plates carried by said fly wheel, a clutch housing slidable on said transmission shaft, clutch plates in said clutch housing normally in frictional contact with the clutch plates of said fly wheel, and means engaging said clutch housing adapted for sliding said clutch housing on said transmission shaft to release said plates so that the engine shaft may operate independent of the transmission drive shaft.

5. In a clutch for tractors, the combination with an engine shaft and a transmission drive shaft alining therewith, of a plurality of clutch plates in driving relation to said engine shaft, a clutch housing slidable on said transmission drive shaft, a plurality of clutch plates carried by said clutch housing and in alternate relation to the clutch plates of said engine shaft, means in said clutch housing maintaining all of said clutch plates normally in frictional contact so that said transmission drive shaft may be operated by said engine shaft, and means engaging said clutch housing adapted for shifting said clutch housing relative to said transmission shaft to disconnect said transmission drive shaft relatively to said engine shaft.

6. In a clutch, the combination with an engine shaft, of a fly wheel carried thereby, a transmission drive shaft extending into said fly wheel and supported thereby, a plurality of clutch plates supported within said fly wheel in driving relation to said engine shaft, a clutch housing slidable on said transmission drive shaft, and extending into said fly wheel, a plurality of clutch plates in said clutch housing normally in frictional contact with the clutch plates of said fly wheel, and pedal actuated shoes engaging said clutch housing adapted for moving said clutch housing toward said fly wheel to release the first mentioned clutch plates relative to the last mentioned clutch plates so that said engine shaft may operate independently of said transmission drive shaft.

7. In a clutch including disks adapted for frictional driving relation, a fly wheel, supporting means at the front side of the fly wheel in a plane outside of said fly wheel and extending therein to maintain some of said disks in said wheel and free of the rim thereof, and means within the rear side of said fly wheel free of the rim thereof and providing a disk abutment independent of the fly wheel adapted for maintaining an operative relation between the disks of said clutch.

8. The combination of a fly wheel, drive and driven shafts, and connected front and rear housings normally in spaced relation to said fly wheel and bodily shiftable in said fly wheel and containing clutch mechanism adapted to establish a driving relation between said shafts.

9. The combination of a fly wheel having a hub, a transmission shaft having an end thereof journaled in the hub of said fly wheel, an engine shaft connected to the hub of said fly wheel independent of said transmission shaft, clutch mechanism bodily shiftable in said fly wheel in spaced relation to the rim thereof, and connecting means for said engine shaft to said wheel hub serving as a support for a portion of said clutch mechanism.

In testimony whereof I affix my signature in the presence of two witnesses.

HENRY FORD.

Witnesses:
 ROBERT E. WALTER,
 E. G. SIEBOLD.